US008061624B2

(12) United States Patent
Forster

(10) Patent No.: US 8,061,624 B2
(45) Date of Patent: Nov. 22, 2011

(54) RFID STRAP AND CUTTING DEVICE

(75) Inventor: Ian J. Forster, Essex (GB)

(73) Assignee: Avery Dennison Corporation, Pasadena, CA (US)

( * ) Notice: Subject to any disclaimer, the term of this patent is extended or adjusted under 35 U.S.C. 154(b) by 191 days.

(21) Appl. No.: 12/647,619

(22) Filed: Dec. 28, 2009

(65) Prior Publication Data

US 2011/0155813 A1  Jun. 30, 2011

(51) Int. Cl.
*G06K 19/05* (2006.01)
(52) U.S. Cl. ........................................ 235/492; 235/487
(58) Field of Classification Search .................. 235/492, 235/380, 487, 472.02
See application file for complete search history.

(56) References Cited

U.S. PATENT DOCUMENTS

| 6,884,833 | B2 * | 4/2005 | Chheang et al. | 524/445 |
| 7,548,167 | B2 * | 6/2009 | Yamagajo et al. | 340/572.8 |
| 7,913,917 | B2 * | 3/2011 | Speich | 235/492 |
| 7,930,815 | B2 * | 4/2011 | Coleman et al. | 29/600 |
| 7,963,451 | B2 * | 6/2011 | Kawai | 235/492 |

* cited by examiner

*Primary Examiner* — Daniel St. Cyr
(74) *Attorney, Agent, or Firm* — Avery Dennison Corporation Mentor, Ohio

(57) ABSTRACT

The present invention describes an RFID tag and a method of making an RFID tag. The RFID tag can include a first substrate with a conductive layer disposed thereon. Further, the RFID tag can be formed with a second substrate that can have any number of components, for example a strap, a processor, a blade and a coupling mechanism mounted thereon. Also, the second substrate can be coupled to the first substrate with a coupling mechanism.

20 Claims, 2 Drawing Sheets

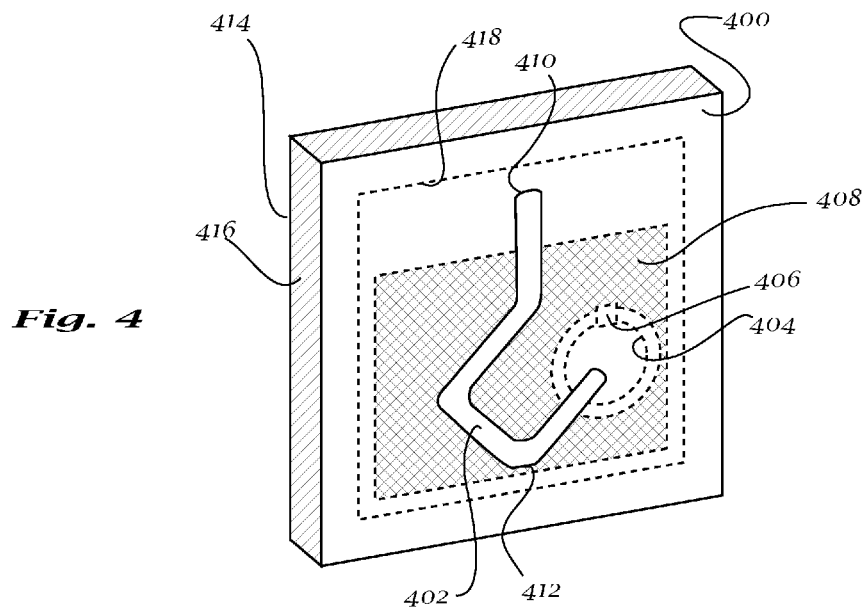
Fig. 4
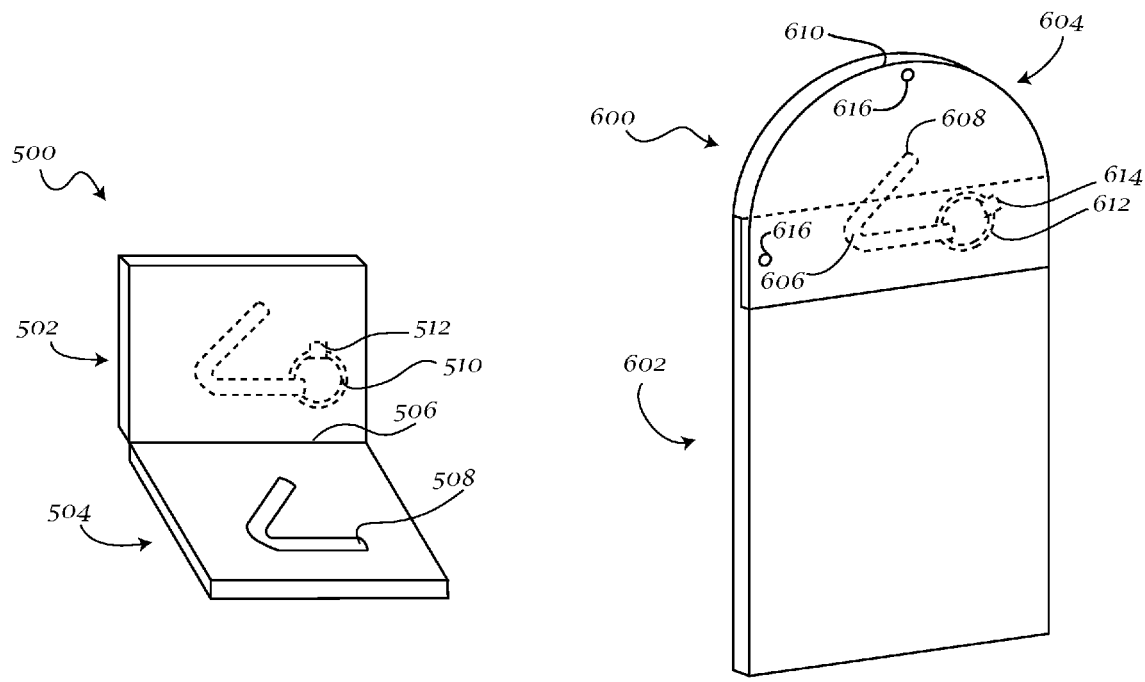
Fig. 5
Fig. 6

RFID STRAP AND CUTTING DEVICE

FIELD OF THE INVENTION

The present invention is in the field of radio frequency identification (RFID) device manufacturing.

BACKGROUND OF THE INVENTION

The use of radio frequency identification (RFID) to identify one of a plurality of items is well known. Typically RFID Tags consist of a semiconductor device, formed in one or more materials such as an organic semiconductor, for example a doped polyanyline, an inorganic semiconductor such as doped amorphous silicon or a doped crystal silicon, and an antenna, capable of receiving energy in the near field, far field or both.

The semiconductor circuit performs functions such as the rectification of energy from a reader device to provide some or all of the power for the device, receive circuits to accept commands from a reader system if required, a logic circuit to store an identification code and a method of sending information back to a reader, such as varying the semiconductors impedance presented to the antenna, typically described as backscatter modulation. The above described device is commonly described as an RFID chip. The RFID Chip maybe directly attached to the antenna or attached via an electric field coupling, a magnetic field coupling or a combination of both. Alternatively, the RFID Chip may be first attached to a structure having two or more electrical leads, which is then attached to an antenna by either direct connection, an electric field coupling, a magnetic field coupling or a combination of both. This is typically referred to as a "strap" or "interposer". The RFID Chip stores data, which can include identifying data unique to a specific item, which is accessed by a device commonly described as a reader or interrogator.

RFID tags can be attached to items for inventory control, shipment control, and the like. RFID tags are particularly useful in identifying, tracking and controlling items such as packages, pallets, and other product containers. The location of each item can be tracked and information identifying the owner of the item or specific handling requirements, can be encoded into the RFID tag and accessed by a reader in a suitable location, such as a portal for taking goods in and out of a building, or by a hand-held device.

RFID tags have been incorporated into a pressure sensitive adhesive-backed label for items contained in temporary packaging, such as cardboard cartons, or containers which are to undergo a number of reuses, such as pallets, waste containers, shipment containers and the like. These labels are fabricated by attaching an antenna made of metal foil or other suitable material to a substrate material such as paper, film and the like, also referred to as an inlay substrate.

Construction of an RFID device can include an RFID chip or strap that is attached to the substrate in cooperative disposition with the antenna to form what is typically referred to as an RFID tag inlay. Exemplary RFID inlays are available from Avery Dennison RFID Company of Clinton, S.C. and sold under the trade designation "AD" followed by a model or part number. An adhesive is then applied to the surface of the inlay substrate over the antenna and RFID chip, and the inlay substrate may then be attached directly to a substrate or article or may be made or incorporated into a label substrate, on which text and graphics can be imprinted, so that the adhesive, antenna and RFID chip are sandwiched between the inlay substrate and the label substrate. A layer of adhesive is then applied to the surface of the label substrate over the inlay, followed by the addition of a release layer over the adhesive to form a laminate.

The laminate can then be die cut to the finished label size. Printing of a bar code or other information, text and graphics onto the finished label, and coding of the RFID Tag can take place before or after the die cutting step. The labels are then wound tightly onto a spool or processed into a fan-fold configuration for shipment to a customer or return to the electronic manufacturer or marketer. The application of the inlay to the paper is usually carried out by an electronic manufacturer and the remaining steps are typically carried out by a label manufacturer.

Traditionally, RFID tags are produced as self-contained devices, including both a strap and antenna, where the antenna is a significant cost in the assembly. Additionally, effective coupling of the antenna and the strap must be achieved for the RFID tag to be operable. That is, specific antennas are designed for particular end use applications. This requires a great deal of precision due to the relative size of the components and may also lead to a large inventory in order to accommodate the demands of a broad customer base. Furthermore many RFID tags are permanently affixed to particular items and cannot be recovered for reuse.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

One exemplary embodiment of the invention describes an RFID tag. The RFID tag can include a first substrate with a conductive layer disposed thereon; and a second substrate that can have a strap, containing a RFID chip, a cutting device, such as a blade and a coupling mechanism mounted thereon, where the second substrate can be coupled to the first substrate with a coupling mechanism.

Another exemplary embodiment can include a method of forming an RFID tag. The method can include steps for mounting a conductive layer on a first substrate; mounting a blade, a strap, containing a RFID Chip on a second substrate; pressing the second substrate against the first substrate; cutting the first substrate and the conductive layer with the blade on the second substrate to form an antenna; and anchoring the second substrate to the first substrate.

In yet another exemplary embodiment, a package is provided having a conductive material provided on at least a portion of the package, a RFID intermediate is provided having a cutting device, strap leads and an integrated circuit or chip, the RFID intermediate is pressed against the conductive layer on the package such that the RFID intermediate is brought into operative contact with the conductive layer forming an RFID device integral with the package.

The cutting or steps of pressing or engaging the RFID device into operative association with the substrate creates a shaped configuration that forms a particular antenna adapted to serve a specific application.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE FIGURES

Advantages of embodiments of the present invention will be apparent from the following detailed description of the exemplary embodiments thereof, which description should be considered in conjunction with the accompanying drawings in which:

FIG. 4 shows an exemplary perspective back view of an RFID tag applied to a substrate;

FIG. 5 is another exemplary view of an RFID device; and

FIG. 6 is another exemplary front view of an RFID tag applied to a substrate.

DETAILED DESCRIPTION OF THE INVENTION

Aspects of the invention are disclosed in the following description and related drawings directed to specific embodiments of the invention. Alternate embodiments can be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

The word "exemplary" is used herein to mean "serving as an example, instance, or illustration". Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Generally referring to FIGS. 1-6, an RFID device and method of applying the same to a substrate is disclosed. The RFID device can be manufactured using any of a variety of processes, for example a pre-conversion process that is an antenna is formed and then an RFID device can be attached to the antenna at a later date. The RFID device can further include a paper web onto which a variety of items, such as human and machine-readable indicia can be printed. The RFID tag can further be formed using a polyethylene terephthalate (PET) material such as with a RFID inlay in which a chip or strap is placed on an antenna that is disposed on the PET substrate.

Figure 1:
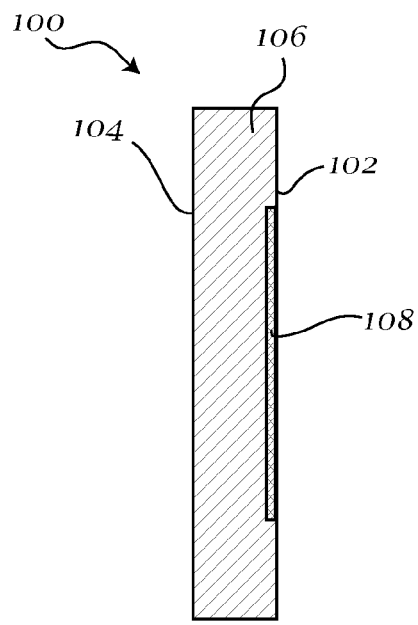
FIG. 1 shows an exemplary substrate.
Figure 2:
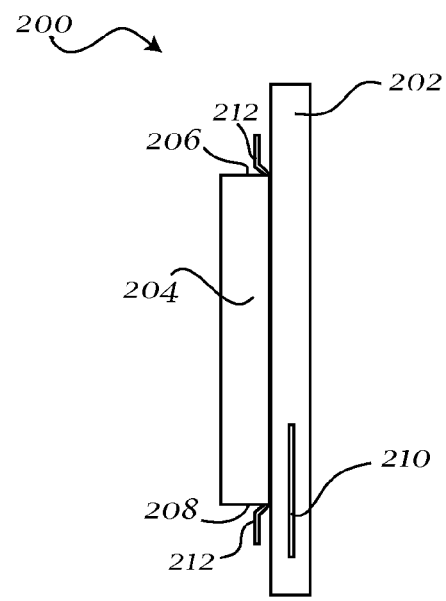
FIG. 2 shows an exemplary view of an RFID device.

FIGS. 1 and 2 show exemplary embodiments of a substrate and a RFID device. FIG. 1 shows a side view of an exemplary substrate 100. Substrate 100 can have a front wall 102 and a back wall 104. Between the front wall 102 and back wall 104 there can be a filler material 106, for example corrugated material. Other suitable substrates may include a foam core, paperboard. Substrate 100 can be any of a variety of materials, for example corrugated cardboard, plastic, foam core board, PET, paperboard or the like. A section of conductive material 108, for example aluminum foil, copper, conductive ink or the like, can be incorporated into substrate 100, for example on the interior of front wall 102. The conductive material 108 can take any shape or form. The conductive material can also include a particular logo, design, trademark or trade name of a customer, user or the like or can form part of the sealing, securing mechanism for the package or other utilitarian feature.

FIG. 2 shows an RFID device 200. RFID device 200 can be made of an outer substrate 202 and a cutting mechanism such as a blade or sharp or hardened edge 204. Outer substrate 202 can be made of a variety of materials, for example a hard plastic, reinforced or stiffened paperboard. Blade 204 can have an upper point 206 and a lower point 208, and can be shaped in a variety of forms. In one exemplary embodiment upper point 206 can be a proximal end and lower point 208 can be a distal end of blade 204, and arranged substantially parallel to substrate 202. Reactive RFID strap 210 can be included within outer substrate 202. RFID device 200 can have locking mechanisms 212 placed in a number of suitable locations. The locking mechanisms 212 can form anchor tabs that can be inserted into the package or substrate and prevent the RFID device 200 from being removed without.

Figure 3:
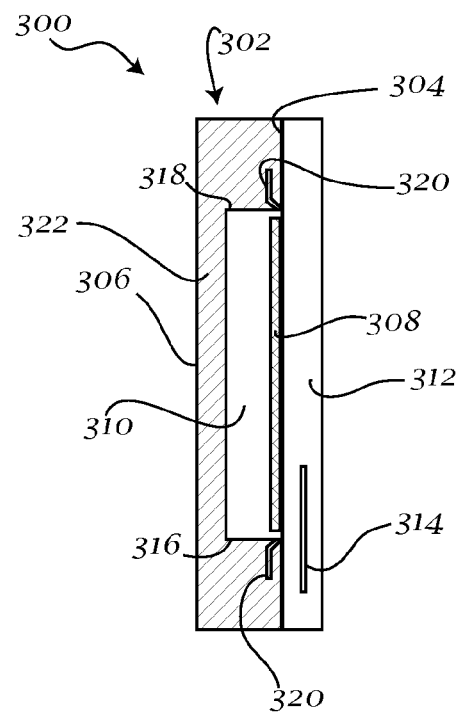
FIG. 3 shows an exemplary perspective side view of an RFID tag applied to a substrate.

FIGS. 3 and 4 show exemplary embodiments of an RFID device applied to a substrate that together can form an RFID tag. FIG. 3 shows a side view of an exemplary assembly of a coupled RFID tag 300. Substrate 302 can have both front wall 304 and back wall 306. Between front wall 304 and back wall 306 there can be a filler material 322, for example corrugated material, foam or air cells. Substrate 302 can be any of a variety of materials, for example corrugated cardboard, plastic, foam core board, PET, open celled paperboard or the like. A section of conductive material 308, for example aluminum foil, can be incorporated into substrate 302, for example in the interior of front wall 304.

An RFID device, such as previously discussed with respect to FIG. 2, can include blade 310 and outer substrate 312. Outer substrate 312 can be made of a variety of materials, for example a hard plastic. Blade 310 can have an upper point 318 and a lower point 316 and can be shaped in a variety of forms. In one exemplary embodiment upper point 318 can be a proximal end and lower point 316 can be a distal end of blade 310 and arranged substantially parallel to substrate 312. Reactive RFID strap 314 can be included within outer substrate 312.

Still referring to FIG. 3, an RFID tag can be formed by placing an RFID device in a location above a top edge of conductive material 308 which can be within front wall 304. The RFID device can be pressed into front wall 304. Blade 310 can penetrate front wall 304, conductive material 308 and filler material 322. Blade 310 can cut out or otherwise remove a shaped section of the conductive material 308 and filler material 322, similar to for example a cookie cutter which removes a particular shape or pattern of dough. The shaped section can form an antenna for an RFID tag having a predetermined configuration for the particular application for which the antenna is to be used with. Any cut sections of conductive material 308 and filler material 322 can be forced backwards into substrate 302 to create the shaped section. The cut sections can be retained or can be removed by suitable means, for instance a vacuum, peeling away the material, mechanical picking or such other means as may be appropriate. Locking mechanisms 320 can anchor the RFID device to the filler material 322 of substrate 302. Reactive strap 314 can be cooperatively disposed with respect to blade 310 (and hence an antenna formed after blade 310 is applied to substrate 302) so that reactive strap 314 can couple with the formed antenna in a manner that can make an RFID inlay.

The exemplary RFID tag of FIG. 3 can be used for a variety of applications, including tracking and controlling packages and inventory. Furthermore an RFID device can be recovered from the waste chain after an initial use, for example by removing an RFID device from the used substrate. The RFID device can then be recycled, for example by reprogramming the RFID Chip and reused.

FIG. 4 shows an exemplary back view of the exemplary embodiment described above in FIG. 3. Blade 402, for example a cutting blade, can have an upper point 410 and a lower point 412 and can be shaped in a variety of forms. In one exemplary embodiment, upper point 410 can be a proximal end and lower point 412 can be a distal end of blade 402, and arranged substantially parallel to outer substrate 412. Blade 402 can be compressed through front wall 414, for example penetrating any of front wall 414, conductive layer 408, and filler material 416. The shaped section can form the antenna for an RFID tag. Blade 402 need not penetrate back wall 400. Upper point 410 of blade 402 can be above the top edge of conductive material 408. Blade 402 can be attached to outer substrate 412. Outer substrate 412 can include reactive strap 404. Outer substrate 412 and thus reactive strap 404 need not penetrate front wall 414. Reactive strap 404 can be cooperatively disposed with respect to blade 402 (and hence the formed antenna) so that reactive strap 404, and thus RFID Chip 406 can couple with the formed antenna in a manner that can make an RFID tag operative at a longer range than the cutting device could achieve on its own.

An exemplary RFID tag, such as that shown in FIG. 4, can be used for a variety of applications, including tracking and controlling packages and inventory. Furthermore an RFID device (which can be blade 402 and outer substrate 412) can be recovered from the waste chain after an initial use, and can be recycled and reused.

FIGS. 5 and 6 show additional exemplary embodiments of an RFID device and a substrate on which the RFID device can be applied. FIG. 5 can include an RFID device 500. RFID device 500 can have an upper half 502 and a lower half 504. Upper half 502 and lower half 504 can be made of any of a variety of materials, for example hard plastic. Upper half 502 and lower half 504 can be joined at hinge 506. Hinge 506 can operate to bring upper half 502 into contact with lower half 504. Upper half 502 and lower half 504 can close flush against one another, allowing an RFID device to fasten together. An RFID device can be coupled together by any of a variety of means, for example, a clip, clasp, spring, anchor, chemical coupling, or the like. When closed, RFID device 500 can be shaped in any of a variety of forms, for example a sphere, cylinder, cube or the like.

RFID device 500 can also have blade 508, for example a cutting blade. Blade 508 can extend from either upper half 502 or lower half 504 or both. Upper half 502 and lower half 504 can be clipped together such that blade 508 does not interfere with the complete closure of RFID device 500. For example, the half opposite blade 508 can include a hollow space or recess where blade 508 can be housed if upper half 502 and lower half 504 of RFID device 500 are coupled together. RFID device 500 can also house strap 510 and semiconductor device 512. Strap 510 and semiconductor device 512 can be housed in either upper half 502 or lower half 504 or may extend between the sections.

Referring now to FIG. 6, an exemplary embodiment of an RFID tag 600, which can be composed of an RFID device 604 clipped to a substrate 602. Substrate 602 can be made of any of a variety of materials, for example a paper ticket used in retail applications. Substrate 602 can include a layer of conductive material, for example aluminum foil, copper, conductive ink or the like. RFID device 604 can be formed of two halves. The two halves can be made of any suitable material, for example hard plastic. RFID device 604 can include blade 606, for example a cutting blade. Blade 606 can have an upper blade point 608. RFID device 604 can be coupled to the top of substrate 602, for example by pressing together the respective halves of RFID device 604. In another exemplary embodiment RFID device 604 can couple to the top of substrate 602 by any of a variety of means, for example, a clip, clasp, spring, chemical coupling or the like.

If RFID device 604 is coupled to the top of substrate 602, blade 606 can cut out, or otherwise remove a shaped section of substrate 602. RFID device can be coupled to substrate 602 in such a manner that upper blade point 608 is located above the top edge of substrate 602 and the conductive material within. The shaped section cut out of substrate 602 can form the antenna for RFID tag 600.

RFID device 604 can house strap 612 and RFID chip 614. Strap 612 can be oriented in such a manner that if RFID device 604 is clipped to the top of substrate 602, strap 612 can couple with the antenna formed by the shaped section cut out of substrate 602. RFID Chip 614 and strap 612 can couple with the formed antenna and can make RFID tag 600 operable.

In one exemplary embodiment RFID tag 600 can be a sales tag that can be affixed to an item, for instance an article of clothing. RFID can be affixed to an item, for example by a pin retained inside RFID device 604, other securing or affixing devices include adhesives, mechanical fasteners, hook and loop fasteners, Swiftach® fasteners (available from Avery Dennison Corporation, Pasadena, Calif.) or other fastening devices known in the industry.

In another exemplary embodiment, RFID tag 600 can be removed from an item using any suitable device, for example a magnet or pattern of magnets, clamp tools and the like. Furthermore RFID device 604 can be recovered from the waste chain after an initial use, and can be recycled and reused.

In another exemplary embodiment, RFID tag 600 can also serve additional functions, for example as an electronic article surveillance (EAS) device, for loss prevention, theft protection or any other embodiments where RFID is required.

It will thus be seen according to the present invention a highly advantageous RFID device and method of using an RFID intermediate has been provided. While the invention has been described in connection with what is presently considered to be the most practical and preferred embodiment, it will be apparent to those of ordinary skill in the art that the invention is not to be limited to the disclosed embodiment, and that many modifications and equivalent arrangements may be made thereof within the scope of the invention, which scope is to be accorded the broadest interpretation of the appended claims so as to encompass all equivalent structures and products.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:
1. An RFID tag comprising:
   a first substrate with a conductive layer disposed thereon; and
   a second substrate having a strap, a RFID chip, a blade and a coupling mechanism mounted thereon, the second substrate coupled to the first substrate with the coupling mechanism.
2. The RFID tag of claim 1, wherein the blade on the second substrate cuts the conductive layer on the first substrate to form an antenna.

3. The RFID tag of claim 1, wherein the first substrate is a corrugated material.

4. The RFID tag of claim 1, wherein the conductive material disposed on the first substrate is aluminum foil.

5. The RFID tag of claim 1, wherein the blade mounted on the second substrate is shaped in a substantially coiled form.

6. The RFID tag of claim 1, wherein the blade mounted on the second substrate further comprises a first portion to cut the first substrate and a second portion to cut the first substrate and the layer of conductive material.

7. The RFID tag of claim 1, wherein the antenna is formed when the device is attached to the substrate, and the blade displaces a section of the conductive material.

8. The RFID tag of claim 1, wherein the first substrate has a front wall, a back wall, and filler material disposed between the front wall and said back wall.

9. The RFID tag of claim 8, wherein the blade penetrates the front wall and filler material but not the back wall when the device attaches to the substrate.

10. The RFID tag of claim 1, wherein the second substrate is removed from the first substrate after a predetermined time.

11. The RFID tag of claim 1, wherein the second substrate is plastic.

12. The RFID tag of claim 1, wherein the coupling mechanism is an anchor that is anchored into the first substrate.

13. The RFID tag of claim 1, wherein the coupling mechanism is a clip that mates with a receiving clip on the first substrate.

14. A method of forming an RFID tag, comprising:
   mounting a conductive layer on a first substrate;
   mounting a blade, a strap and a RFID chip on a second substrate;
   pressing the second substrate against the first substrate;
   cutting the first substrate and the conductive layer with the blade on the second substrate to form an antenna; and
   anchoring the second substrate to the first substrate.

15. The method of claim 14, further comprising:
   cutting the first substrate with a first portion of the blade mounted on the second substrate;
   cutting the first substrate and the conductive layer with a second portion of the blade mounted on the second substrate; and
   wherein the cutting forms a particular shape of an antenna.

16. The method of claim 14, further comprising:
   removing the strap and RFID chip from the second substrate; and
   recycling the strap and processor.

17. A method of forming a RFID device, comprising the steps of:
   providing a package having a conductive surface provided on at least a portion of the surface;
   positioning a RFID intermediate adjacent the surface of the package, the RFID intermediate having a cutting mechanism, strap leads and an RFID chip;
   pressing the RFID intermediate into the conductive layer on the surface of the package so that the cutting mechanism pierces the conductive layer to form a particular shape of an antenna; and
   engaging the RFID intermediate with the conductive layer creating an operative engagement between the RFID intermediate and the package such that the RFID intermediate with the conductive layer functions as an RFID device.

18. The method as recited in claim 17, wherein the step of pressing includes a further step of anchoring the RFID intermediate into a permanent attachment with the package.

19. The method as recited in claim 17, wherein the cutting mechanism is a blade.

20. The method as recited in claim 17, wherein the package is an identification tag.

\* \* \* \* \*